United States Patent [19]

Owens

[11] Patent Number: 5,219,609

[45] Date of Patent: Jun. 15, 1993

[54] METHOD OF COATING A PREVIOUSLY FILLED STRESS CRACK WITH A SPRAYED AEROSOL COMPOSITION

[76] Inventor: R. Larry Owens, 2107B Fairway Ct., Conyers, Ga. 30208

[21] Appl. No.: 737,390

[22] Filed: Jul. 29, 1991

Related U.S. Application Data

[63] Continuation-in-part of Ser. No. 487,135, Mar. 2, 1990, abandoned.

[51] Int. Cl.$^5$ .............................................. B32B 35/00
[52] U.S. Cl. .................................... 427/140; 427/379; 427/385.5; 427/407.1; 427/421
[58] Field of Search ............ 427/140, 421, 379, 385.5, 427/407.1

[56] References Cited

U.S. PATENT DOCUMENTS 4,264,650 4/1981 Schulze et al. ................... 427/385.5
4,372,991 2/1983 Kendall ............................... 427/140

Primary Examiner—Michael Lusigan
Assistant Examiner—Benjamin L. Utech
Attorney, Agent, or Firm—Vivian L. Steadman; Harry I. Leon

[57] ABSTRACT

A method of covering stress cracks in drywall, plaster or the like which comprises the step of spraying an aerosol composition which air dries to a film which has an elasticity of at least 100 percent elongation. The aerosol composition comprises a propellant, a solvent, and a concentrate including film-forming copolymers and resins. To prevent any apparent reoccurrence of the crack, the aerosol composition is pigmented. The pigmentation of the aerosol composition is such that, when the film is stretched, the outline of any reappearing stress crack will not become noticeably visible either through the film or because of marked differences between the coloration of the stretched film and of any topcoat of paint on adjacent surfaces.

3 Claims, No Drawings

METHOD OF COATING A PREVIOUSLY FILLED STRESS CRACK WITH A SPRAYED AEROSOL COMPOSITION

CROSS-REFERENCE TO RELATED APPLICATION

This application is a continuation-in-part of application Ser. No. 487,135, filed Mar. 2, 1990 now abandoned.

BACKGROUND OF THE INVENTION

1. Field of the Invention

This invention relates to an elastomeric coating and more particularly to a pressurized aerosol composition with elastomeric properties dissolved in a common solvent that is nonflammable, together with a compatible liquefied, normally gaseous propellant.

2. Description of the Prior Art

Methods of repairing stress cracks in interior walls using spackling or joint compound are well known in the prior art. Because the spackling or joint compound used in these methods is inflexible when dried, cracks tend to reappear, often within a few months.

More recently, products designed to resist the reoccurrence of repaired cracks in interior walls have appeared. These products have included a solvent-based liquid coating applied in two coats to a fiberglass mesh tape which requires about four hours of drying time. Another such product is a paste which has a higher degree of flexibility than either spackling or joint compound but which, like them, must be sanded when dried and which will eventually crack, albeit in a year or so.

A combination scratch filler and primer which can be sprayed in very heavy films onto a substrate surface is taught by Kendall in U.S. Pat. No. 4,372,991. These very heavy films are employed to actually fill holes and depressions a quarter inch deep. When dried, the films have very low elasticity and can be sanded to an extremely glossly surface.

Very viscous, heavy bodied elastomeric materials which resemble glue, on the other hand, have been used on exterior surfaces such as roofs both to fill cracks and prevent their reoccurrence, all in one operation. These elastomeric materials, which do not spray well, are typically applied with a brush or roller and dry as a thick, visually obtrusive film.

As far as the applicant is aware, attempts to provide a method of covering previously filled stress cracks in interior walls by dispensing a liquid aerosol which, when dry, forms an adhesive film capable of being stretched twice its original length over a previously repaired crack in drywall, plaster and the like are nonexistent in the prior art.

Nor does the prior art suggest a suitable composition for a liquid aerosol from which to produce an adhesive, elastic, paintable film. Indeed, materials such as silicone or urethane formulations widely used in caulking applications and well known for their property of exhibiting long-lasting elasticity and a high degree of adhesiveness are not paintable; and certain paintable caulking materials when dried in thick-bead form tend to crack readily.

SUMMARY OF THE INVENTION

The present invention provides a method of covering stress cracks in drywall, plaster or the like which comprises the step of spraying an aerosol composition which air dries to a paintable, adhesive film which has an elasticity of at least 100 percent elongation. The aerosol composition is sprayed on to the site of a stress crack shortly after it has been filled with conventional spackling compound or the like and before the crack has had a chance to reappear. Not only does aerosol spraying enhance the elasticity of the film but such spraying also provides a uniformly thick coating which tends to be more finely "feathered" along its edges than would be a coating applied with a brush or roller.

The aerosol composition comprises a propellant and a concentrate which is solvent-based. The concentrate may consist of a caulking material which, if it were applied as a thick-bead form, would not be very elastic but which, when deposited as an aerosol to form a film a few mils thick, exhibits a high degree of elasticity. Films of such caulking material built up in layers which have been allowed to dry between passes have been found to have elasticity which allows the films to be stretched to greater than 100 percent elongation without permanent deformation. To reduce the time required to produce a laminated film, a highly volatile solvent which evaporates in a few seconds is the preferred carrier for a solvent-based concentrate utilizing such caulking materials.

One suitable solvent-based concentrate contains essentially film-forming copolymers with thermoplastic and elastomeric blocks, both saturated hydrocarbon and aromatic resins, and an aromatic solvent. In addition, the aerosol composition is preferably pigmented. Pigmentation of the aerosol composition is within a range of pigment concentrations such that, when the film is stretched, the outline of the void associated with any reappearing stress crack will not become noticeably visible either through the film itself or because of marked differences between the coloration of the stretched portions of the film and of adjacent dried topcoat paint which did not stretch with the film.

Minute pocks produced on the surface of the film during the escape of the propellant therefrom impart a desirable low sheen appearance to the film which also helps to blend the film in with any coating of latex paint already dried on a wall. The aromatic solvent in the concentrate of the preferred embodiment is employed in part to lower the viscosity of the aerosol composition and adjust the size of the pocks downwardly.

GENERAL DESCRIPTION OF THE INVENTION

The aerosol composition includes a propellant, a solvent and a concentrate. The propellant is preferably one of the well-known fluorocarbon propellants such as chlorodifluoromethane which is non-flammable but may be carbon dioxide or any convenient propellant or mixture of propellants having sufficient vapor pressure to effect dispensing of the contents of the container in which the composition is packaged. The quantity of the propellant should be sufficient to effectively disperse all of the contents of the container. Generally, the quantity of the propellant and solvent used in the composition is about 30% to 40% by weight thereof, with the quantity of the propellant being preferably about 22% by weight of the composition.

The remainder of the composition, generally comprising about 60% to about 70% by weight of the composition, contains the concentrate which is a solvent-based film-forming composition of copolymers and resins.

The solvent used in the composition according to the present invention is preferably non-flammable, highly volatile, and compatible with both the propellant and the concentrate described hereinbelow. The choice of a chlorinated hydrocarbon solvent such as 1,1,1-trichloroethane provides the composition with the property of being sufficiently fast drying that coats of the composition applied in succession a few seconds apart are actually laminated layers rather than a single layer. Moreover, 1,1,1-trichloroethane because of its high vapor pressure reduces the quantity of fluorocarbon propellant which must be consumed with each application of the aerosol composition. As a thin laminated film, the film-forming composition of the present invention has been found capable of stretching to at least double its initial length without permanent deformation. This same film-forming composition, if it were applied as a thick bead, would be relatively inelastic.

The film-forming copolymers and resins employed in the composition of this invention are ones which are soluble in an aromatic hydrocarbon such as toluene or xylene. This aromatic hydrocarbon solvent is employed to help dissolve the solid resins, to control the evaporation rate and to reduce the viscosity of the aerosol composition. By lowering the viscosity of the composition, a more rapid escape of the propellant from the film can occur, thus keeping any pocks produced on the surface of the film small.

Among the film-forming copolymers which can be utilized in the compositions of this invention are copolymers with thermoplastic and elastomeric blocks. The copolymers preferably possess high cohesive strength, elasticity and resiliency and dissolve readily in common hydrocarbon solvents to yield high solids, low viscosity solutions. An example of a preferred film-forming copolymer includes a tri-block resin having an elastomeric block in the center of the copolymer and a thermoplastic block on each end thereof such as the styrene-ethylene/butylene-styrene triblock resin (molecular weight over 100,000) designated as "Kraton G-1651". The ethylene/butylene elastomeric midblock of this copolymer is a saturated olefin rubber that not only possesses high cohesive strength, elasticity, and resiliency but also exhibits an excellent resistance to degradation by oxygen, ozone and ultraviolet light.

Among the resins which can be employed in the composition of this invention are saturated hydrocarbon resins with styrene and aromatic content, which are thermoplastic, of low molecular weight (below 500), soluble in aromatic hydrocarbons and compatible with block copolymers. The primary function of these resins in the composition is to enhance its adhesion and non-tack properties. Examples of preferred resins include "Arkon P85" and "Kristalex 1120".

Additionally, modifier resins are employed in the composition according to the present invention to enhance the stiffness of the aerosol composition as well as its sag resistance. Preferred modifier resins include nonpolar thermoplastic hydrocarbon resins whose molecular weight is below 5000, soluble in aromatic hydrocarbons and compatible with styrene-based block copolymers. An example of a preferred modifier resin is alphamethyl styrene resin, produced by copolymerization of pure aromatic monomers and designated "Kristalex 5140". This aromatic modifier resin also acts to compound with sebs block copolymers to reinforce the end block.

The percentages by weight in the composition, prior to the addition of either the 1,1,1-trichloroethane solvent or of of the propellant, of the triblock resin, of the saturated hydrocarbon resin with styrene and aromatic content, of the modifier resin and of the aromatic hydrocarbon solvent are about 16%, 38%, 16% and 30%, respectively.

In addition to the major components of the aerosol composition, namely, propellant, triblock copolymers, aromatic and saturated hydrocarbon resins, and aromatic hydrocarbon solvent, a number of minor components may also be present in the composition. Included among these minor components is an amount of a conventional pigment sufficient to impart an off-white beige color to the film. Suitable pigments include finely ground rutile titanium dioxide which is added after the solvent-based concentrate has been diluted with 1,1,1-trichloroethane or like solvent until the concentration of titanium dioxide in the concentrate/solvent mixture reaches 2 oz. per gallon. Next the composition is tinted with the addition of a medium to dark pastel colorant such as umber in a concentration range of from ¼ oz. to 1 oz. per gallon. An upper limit on the amount of colorant can be determined by comparing photographs of the shading on test samples of the film, once dried on a suitable substrate, with actual photographs of dot matrices which are variously 10, 20, 30, and 40 percent opaque. Shading for a dried test sample equivalent to that of a dot matrix with no more than 40 percent opacity is acceptable. If greater tinting is employed, the outline of an apparent void will be noticeable between the boundaries of a dried topcoat of pastel latex paint and the stretched portion of the film even though the film is only stretched and is actually still completely covering a reappearing crack.

When the aerosol composition of this invention is sprayed on a substrate surface, the pigmented or unpigmented continuous film rapidly dries to the touch, usually in about 20 minutes. Films which are very adhesive, are paintable with any type of paint and have an elasticity of 100 percent elongation or more have been attained with this composition.

EXAMPLE 1

A solvent-based concentrate to which pigment, solvent and a propellant were later added in the preparation of an aerosol formulation suitable for the formation of a pigmented, elastic film was made up, as follows:

| Component | Percent by Weight |
| --- | --- |
| Ingredient A | 16 |
| Ingredient B | 38 |
| Ingredient C | 16 |
| Ingredient D | 30 |
| | 100 |

Ingredient A is styrene-ethylene/butylene-styrene triblock resin (molecular weight over 100,000) and acts as a film-former. This ingredient, which is ideally suited to the formulation of solvent-based sealants and coatings, differs in molecular structure from the typical plastic or commercial rubber in that it is a tri-block copolymer with an elastomeric block in the center and a thermoplastic block on each end. Ingredient A is commercially available from Shell Chemical Company under the trade name Kraton #G1651. It is identified by CAS Number 66070-58-4 in accordance with the Toxic Substances Control Act.

Ingredient B is saturated hydrocarbon resin with styrene and aromatic content. This ingredient is particularly suitable for use in plastic modification, adhesives and coatings. Ingredient B is commercially available from Hercules Co., Inc. under the trade name Kristalex 1120. CAS Number 9011-11-4. An equivalent is commercially available from the Arkawa Co. under the trade name Arkon P85.

Ingredient C is alpha-methyl styrene resin. This ingredient is primarily used as a modifier resin in high-performance adhesives and coating compositions. Ingredient C is commercially available from Hercules Co., Inc. under the trade name Kristalex 5140. CAS Number 9011-11-4.

Ingredient D is toluene.

Finely-ground titanium dioxide was added to this composition until the concentration of titanium dioxide herein reached 2 oz. per gallon. The composition was then tinted to a shade of off-white beige with the addition of umber colorant in a concentration of from ¼ oz. to 1 oz. per gallon. Test samples of the composition, once dried, were then compared with actual photographs of dot matrices which are variously 10, 20, 30, and 40 percent opaque. Shading for a dried test sample equivalent to that of a dot matrix with no more than 40 percent opacity was found to be acceptable. When greater tinting was employed, an apparent crack was noticeable between the boundaries of the dried paint and the stretched portion of the film.

The concentrate is made up of film-forming agents, anti-sag agents, resins, solvents and pigments which may be manufactured by standard paint manufacturing equipment and techniques.

For aerosol dispensing the concentrate prepared above was mixed with 1,1,1-trichloroethane and chlorodifluoromethane. The quantities of the propellant chlorodifluoromethane and of the solvent 1,1,1-trichloroethane were 22% and 13%, respectively, by weight of the total aerosol composition.

Three coats of the aerosol composition were sprayed in succession onto a substrate surface of sheetrock. Between applications of successive coats, the previously deposited layer of film was allowed to dry thoroughly. The drying time was approximately thrity minutes. Different sections of the substrate surface were then painted with different types of paint, including Sherman Williams Classic 99 Semi-Gloss Enamel, Sherman Williams Superpaint Interior Flat Latex, and Sherman Williams Style Perfect Interior Flat Latex. Once dry, the variously painted samples were then subjected to a simulated aging process in which the samples were continuously exposed to heat of approximately 110 deg. F. and intermittently sprayed with water for a period of one week. The films on the sheetrock samples, which are representative of the common use for the aerosol composition, exhibited little or no cracking, crazing, flaking or the like. In general, the tests showed that the solvent-based aerosol composition according to the present invention bonds well to the sheetrock substrate and to different types of paint and remains elastic longer than the paint itself.

What is claimed is:

1. A method for coating a previously filled stress crack in a substrate surface with a laminated film, the film being uniformly thick and of low sheen and having sufficient elasticity to be stretched to greater than 100 percent elongation without permanent deformation, comprising:

(a) combining a volatile solvent, a propellant, and a composition having a tri-block copolymer, a saturated hydrocarbon resin with styrene, an aromatic resin, and an aromatic hydrocarbon to form an aerosol, the aromatic resin and the tri-block copolymer being present in about equal percentages by weight;

(b) spraying the aerosol onto the stress crack in the substrate surface one layer at a time; and (c) air drying each layer of the aerosol sprayed onto the stress crack in the substrate surface before spraying a successive layer of the aerosol onto the stress crack.

2. A method for coating a previously filled stress crack in a substrate surface with a laminated film, the film being uniformly thick and of low sheen and having sufficient elasticity to be stretched to greater than 100 percent elongation without permanent deformation, comprising:

(a) combining a volatile solvent, a propellant, and a composition having a tri-block copolymer, a saturated hydrocarbon resin, an aromatic resin, and an aromatic hydrocarbon to form an aerosol, the aromatic resin and the tri-block copolymer being present in about equal percentages by weight;

(b) spraying the aerosol onto the stress crack in the substrate surface one layer at a time; and (c) air drying each layer of the aerosol sprayed onto the stress crack in the substrate surface before spraying a successive layer of the aerosol onto the stress crack.

3. The method according to claim 2 which further comprises coloring the aerosol so as to give rise to a dried sample thereof photographing in black and white as having a density which is no greater than that of a dot matrix with 40 percent opacity printed on white paper, so that an outline of an apparent void does not appear, due to differences which may exist in coloration between the film itself and any pastel latex paint applied thereto, as the film stretches to cover any reoccurrence of the stress crack.

* * * * *